United States Patent [19]

Nielsen

[11] 4,132,345
[45] Jan. 2, 1979

[54] CONTAINER COMPRISING A FOLDED BLANK, AND BLANK THEREFOR

[76] Inventor: Paul E. Nielsen, 1341 N. Alexandria Ave., Los Angeles, Calif. 90027

[21] Appl. No.: 867,474

[22] Filed: Jan. 6, 1978

[51] Int. Cl.[2] .............................................. B65D 5/02
[52] U.S. Cl. ........................................... 229/8; 46/19
[58] Field of Search .................. 46/12, 19, 21; 229/8; 206/822

[56] References Cited

U.S. PATENT DOCUMENTS

| | | | |
|---|---|---|---|
| 1,064,124 | 6/1913 | Beaumont | 46/21 |
| 1,899,241 | 2/1933 | Marr | 46/11 |
| 1,950,104 | 3/1934 | Ewers | 229/8 X |
| 2,075,624 | 3/1937 | Potter | 229/8 X |
| 2,666,414 | 1/1954 | Burr et al. | 229/8 X |
| 3,581,708 | 6/1971 | Beck | 229/8 X |
| 3,730,418 | 5/1973 | Spencer | 229/27 R |
| 4,055,250 | 10/1977 | Mayhew | 229/8 X |

*Primary Examiner*—Davis T. Moorhead

*Attorney, Agent, or Firm*—Harris, Kern, Wallen & Tinsley

[57] ABSTRACT

A portable container comprising primarily a single folded blank. Integral folded parts of the blank form a bottom, front and rear walls, gable-shaped end walls, and overlappable gable-shaped covers respectively integrally and hingedly connected to the upper edges of the front and rear walls and closable to form a gable roof. Gable-shaped rafters integral with and extending along the upper edges of the end walls reinforce the end walls and cooperate with a ceiling on one of the covers to brace the end walls. One cover is provided at its apex with a hand grip accessible through openings in that cover and a registering opening in the other. The container includes channels for an insert to be located behind a window opening in the front wall, such channels being formed by flaps forming part of the blank. A triple-layer floor and double thickness end walls provide strength, certain of the layers of the floor and the gable-shaped rafters being formed by flaps integral with inner and outer end wall panels.

15 Claims, 9 Drawing Figures

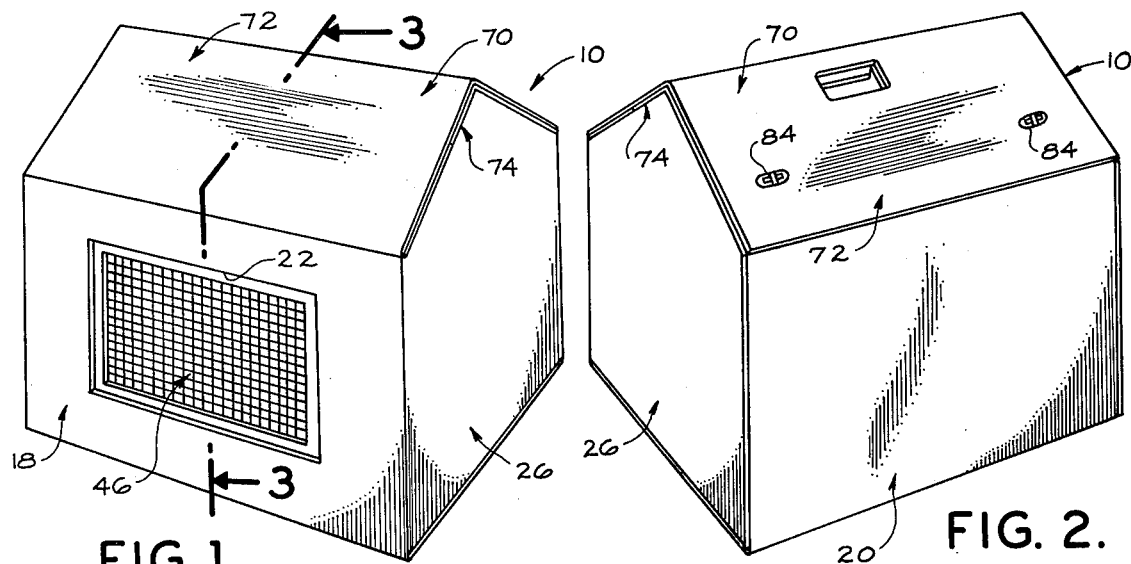
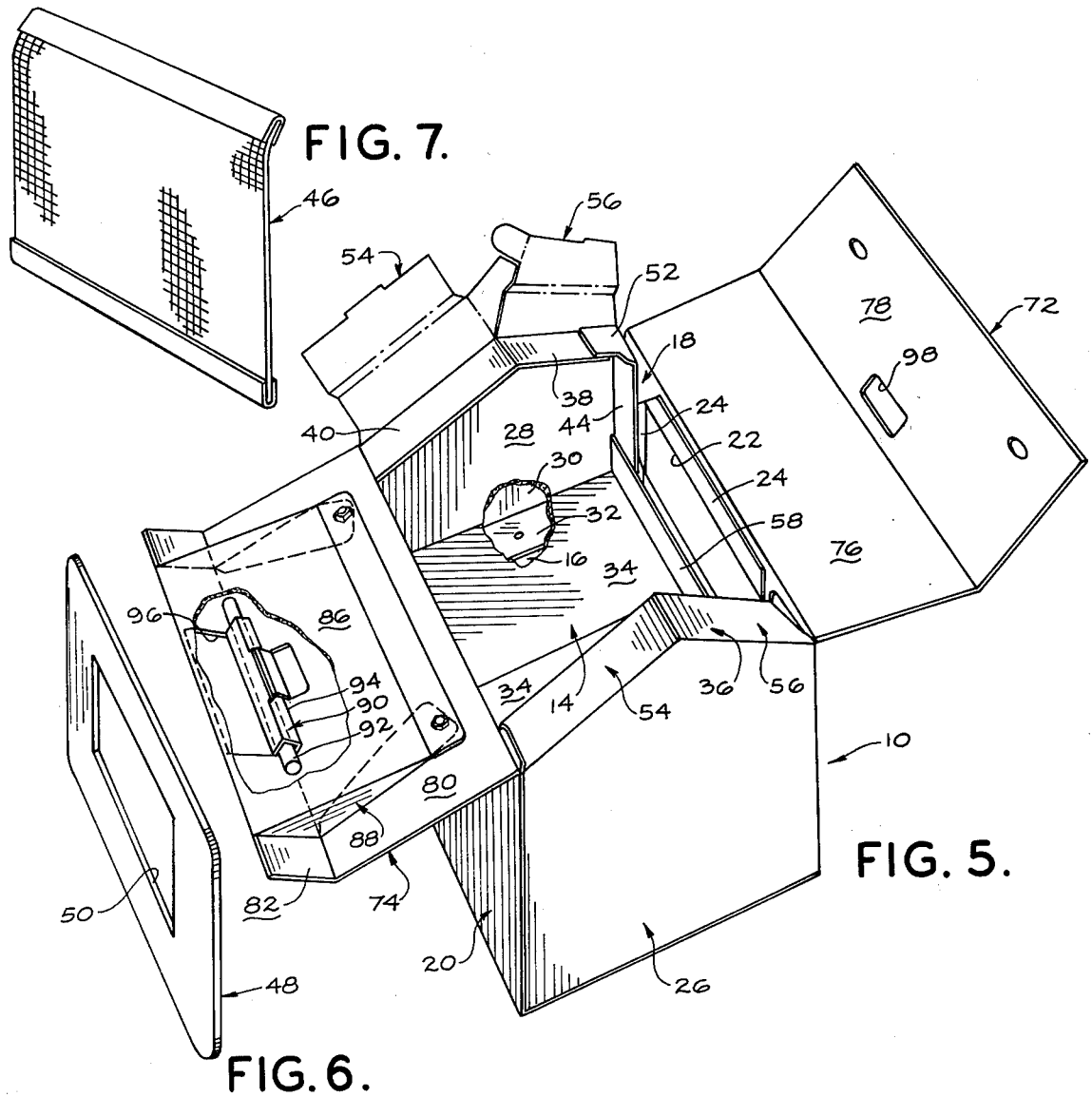

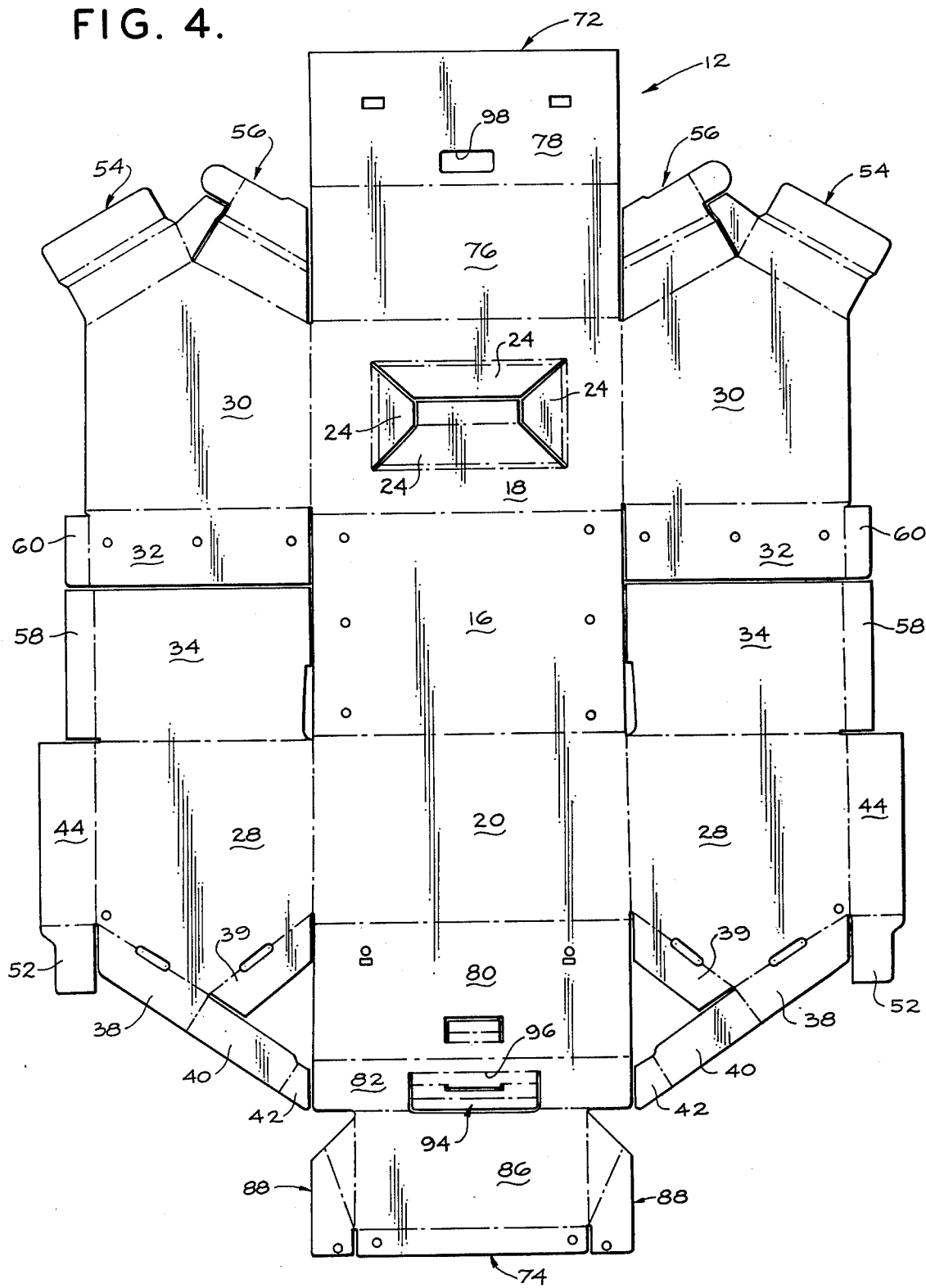

CONTAINER COMPRISING A FOLDED BLANK, AND BLANK THEREFOR

BACKGROUND OF INVENTION

The present invention relates in general to a portable container of folded construction, comprising primarily a single foldable blank made of corrugated paperboard, fiberboard, or other foldable sheet material.

The invention may be embodied in containers having various diverse uses, such as an animal carrying case, houses for such pets as cats or dogs, a cat litter box, or the like. The invention is also useful for purposes not related to animals, examples being a display case, a bookcase, a magazine rack, a toy storage box, a doll house, a tote box, a clothes hamper, a suitcase, or the like.

As further background, containers of folded construction formed primarily from a single blank have, of course, been proposed and/or made heretofore. The present invention comprises various improvements on prior containers of this type.

SUMMARY AND OBJECTS OF INVENTION

A general object of the invention is to provide a container of folded construction, comprising primarily a single folded blank, which is considerably stronger and more rigid than prior structures of a similar nature, while being provided with a fully opening top for easy access to the interior thereof.

More particularly, an important object of the invention is to provide, and the invention may be summarized as comprising, a container of folded construction, made primarily from a single blank, which includes: walls comprising folded integral parts of the blank and including a bottom, front and rear walls and gable-shaped end walls having triangular upper ends, and a top or roof; gable-shaped rafters integral with and extending along the upper edges of the end walls and extending inwardly of the container from the end walls; two overlappable, front and rear gable-shaped covers respectively integrally and hingedly connected to the upper edges of the front and rear walls, one of the covers having ends respectively seatable on the gable-shaped rafters, and the other of the covers being seatable on the first, thereby forming the top or roof; a ceiling integral with and spaced below the first cover mentioned and having ends abuttable with the gable-shaped rafters to act as a brace for the end walls; the ceiling-equipped cover being provided at its apex, above the ceiling, with a hand grip and an opening on one side of such apex for access to the hand grip; and the other cover having an opening adjacent its apex which registers with the opening in the ceiling-equipped cover, when such other cover is seated on the ceiling-equipped cover, to complete access to the hand grip. (As will be apparent from the claims appearing hereinafter, various specific objects of the invention relate to subcombinations of the foregoing structure.)

With the foregoing construction, the invention provides a portable container which is strong and rigid, particularly with respect to bracing of the end walls and with respect to the top or roof, while still providing a top or roof which opens fully for easy access to the interior of the container, these being important features of the invention.

Considering additional, more specific objects of the invention, one is to provide a container wherein each of the end walls is of double thickness and comprises inner and outer end wall panels having along their upper edges interengaged extensions forming the corresponding gable-shaped rafters and interlocked at the peaks of the rafters.

Another specific object is to provide a folded construction wherein the inner and outer end wall panels have along their lower edges inwardly extending superimposed flaps overlying a continuous, uninterrupted lower wall of the floor and forming discontinuous intermediate and upper walls of the floor, whereby the floor is of triple-layer construction for added strength and rigidity, while being provided with a bottom wall having no openings.

Still another object is to provide a portable container of folded construction wherein the ceiling mentioned earlier is so located below the hand grip and the access openings therefor that it protects the user's hand from possible bites or scratches by pets being transported in the container, in addition to performing the hereinbefore-discussed end-wall-bracing function.

Another object is to provide a structure wherein the front wall has a window opening and wherein channels are provided rearwardly of the front wall for a suitable insert rearwardly overlying the window opening, which insert may provide a reinforcement for the edges of the window opening, which may be a screen for closing the window opening, or otherwise. A related object is to provide a construction wherein flaps cooperating with the front wall to form such channels are integral parts of the blank.

Yet another object is to provide flaps, comprising folded integral parts of the blank, located at the four corners of the rear wall and spaced forwardly thereof to permit an insert to be located forwardly of the rear wall and behind such flaps for storage purposes when not in use.

An additional, and important, object of the invention is to provide a portable container of folded construction wherein the various folded integral parts of the blank interlock upon assembly in such a way that no supplementary fastening operations, such as stapling, gluing, or the like, are required.

The foregoing objects, advantages, features and results of the invention, together with various other objects, advantages, features and results thereof which will be evident to those skilled in the container art in the light of this disclosure, may be achieved with the exemplary embodiment of the invention illustrated in the accompanying drawings and described in detail hereinafter.

DESCRIPTION OF DRAWINGS

FIG. 1 is a front perspective view of a portable container which embodies the invention;

FIG. 2 is a rear perspective view of the container of FIG. 1;

FIG. 4 is a plan view of the blank for forming the portable container of FIG. 1, with the various panels, flaps and the like, and the various folding lines, being indicated thereon;

FIG. 5 is a perspective view of the portable container in a partially erected condition and, in particular, showing details of such things as the gable-shaped rafters, the container bottom, the top or roof, and the hand grip, of the invention;

FIGS. 6 and 7 are perspective views showing alternate removable inserts disposable behind a windowed opening in the front wall of the container;

DETAILED DESCRIPTION OF EXEMPLARY EMBODIMENT

Figure 3:
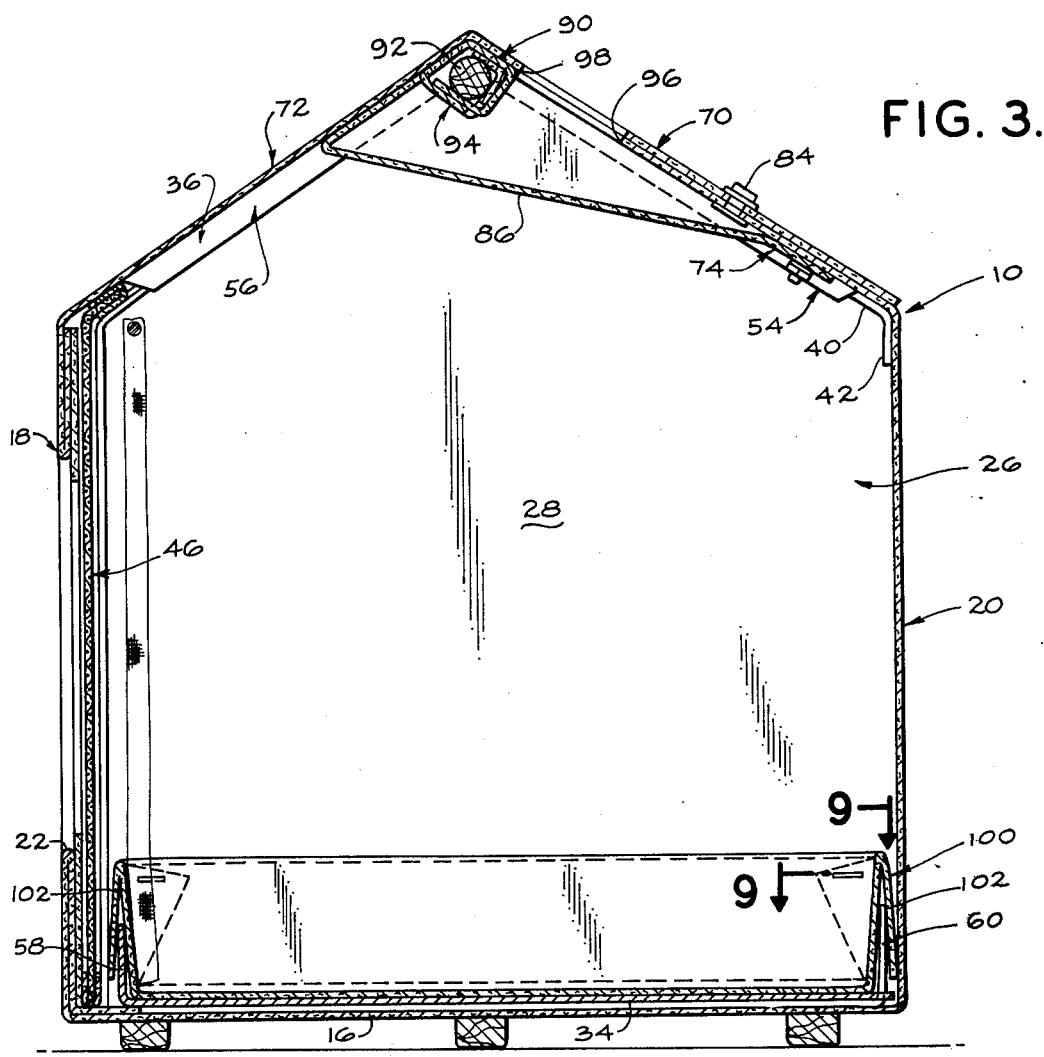
FIG. 3 is an enlarged, transverse vertical sectional view taken along the arrowed line 3—3 of FIG. 1 and showing details of the structure of the portable container.

In the drawings, the portable container of the invention is designated generally by the numeral 10 and comprises primarily a folded blank 12 which is shown in FIG. 4 prior to folding. As will be clear from this figure, the blank 12 comprises a plurality of walls or panels, flaps and tabs joined along fold lines. The blank 12 may be made of any suitable material, such as corrugated paperboard, fiberboard, or the like.

The container 10 includes a triple-layer or triple-thickness bottom or floor 14, FIG. 5, which comprises a continuous lower panel or wall 16, FIGS. 4 and 5.

Folded upwardly from the lower layer 16 of the floor 14 are a front wall 18 and a rear wall 20. The front wall 18 is provided therein with a window opening 22, FIG. 5, reinforced around its edges by inwardly folded flaps 24, FIGS. 4 and 5.

The container 10 includeds two end walls 26 of double thickness and each comprising inner and outer end wall panels 28 and 30. The outer end wall panels 30 and foldably connected to opposite ends of the front wall 18. When the outer end wall panels 30 are folded inwardly at right angles to the front wall 18, flaps 32 thereon overlie the lower layer 16 of the floor 14 to form a discontinuous, interrupted intermediate wall or layer, as will be clear from FIG. 5.

The inner end wall panels 28 are foldably connected to the ends of the rear wall 20 and are adapted to be folded inwardly relative to the rear wall and to be positioned inwardly of the outer end wall panels 30, as will be clear from FIG. 5. The inner end wall panels 28 are provided with flaps 34 which, as best shown in FIG. 5, overlie the flaps 32 in abutting relation and provide the floor 14 with a discontinuous, but uninterrupted, upper wall or layer. Thus, the floor 14 is of triple thickness, comprising the continuous, uninterrupted bottom layer 16, the discontinuous, interrupted intermediate layer formed by the flaps 32, and the discontinuous, uninterrupted upper layer formed by the flaps 34.

The end walls 26 are rendered gable-shaped by providing them with triangular upper ends, as will be clear from FIGS. 1–3 and 5. The container 10 comprises gable-shaped rafters 36, FIG. 5, which are integral with and extend along the upper edges of the end walls 26 and which extend inwardly of the container from the end walls 26 toward each other.

For strength and rigidity, each rafter 36 is of multiple thickness construction. More particularly, as best shown in FIG. 5, each rafter 36 includes flaps 38 and 39 foldably connected to the upper edges of each inner end wall panel 28, as best shown in FIG. 4, another flap 40 being foldably connected to the flap 38. Upon assembly, the flaps 38 and 39 are folded inwardly with the flap 40 overlying the flap 39, the latter being concealed in FIG. 5, but being visible in FIG. 3. The flap 40 terminates in a tab or flap 42 which is folded downwardly in front of the rear wall 20, as shown in FIG. 3, there being one of the flaps 42 at each upper corner of the rear wall 24 for a purpose to be described. Each inner end wall panel 28 is also provided with an inwardly folded flap 44 which is located rearwardly of the front wall 18, as best shown in FIG. 5. These flaps 44 cooperate with the front wall 18 to form vertical channels for the insertion of vertical edges of a screen 46, FIG. 7, adapted to cover the window opening 22. This screen may serve to confine a pet, for example, while providing the pet with a view through the screen. Alternatively, an insert 48, FIG. 6, may be inserted into the channels provided between the flaps 44 and the front wall 18, this insert having an opening 50 slightly smaller than the window opening 22. The insert 48 is formed of a material which resists chewing by a dog, for example, and the edges of the opening 50 therein protect the edges of the window opening 22.

The flaps 44 terminate in tabs 52 which, as best shown in FIG. 5, overlie the flaps 38 for reinforcement purposes.

Continuing to consider the rafters 36, each includes flaps 54 and 56 integral with the upper edges of the outer end wall panels 30. The flaps 54 and 56 are provided with fold lines which render them capable of being folded over, around the inner edges of, and then under the flaps 40 and 38 on the upper edges of the inner end wall panels 28. The flaps 54 and 56 are shown at the upper end of FIG. 5 prior to folding over, around, and under the flaps 40 and 38, and are shown at the lower end of FIG. 5 after such folding to complete the corresponding rafters 36. The flaps 54 and 56 are provided with locking tabs, not specifically identified, which are folded upon assembly to interlock the various parts of the rafters 36 at their apices to further strengthen and rigidify the rafters. With the construction described for the rafters 36, these components of the container 10 are rendered sturdy and rigid, which is an important feature of the invention.

The flaps 34 forming the upper layer of the triple-layer floor 14 are provided with flaps 58 which, as shown in FIG. 5, are folded upwardly rearwardly of the flaps 44 to provide between the flaps 58 and the front wall 18 a horizontal channel to receive the lower edge of the screen 46, or the insert 48.

The flaps 32 forming the intermediate floor layer are provided with flaps 60 which are folded upwardly at the bottom corners of the rear wall 20 and forwardly of such rear wall, as shown in FIG. 3. If the insert 48, or the screen 46, is not in use, it can be inserted forwardly of the rear wall 20 and rearwardly of the flaps 42 at the upper corners of the rear wall the flaps 60 at the lower corners of thereof, for storage purposes. It will be noted that, as is the case with the various other walls, panels, flaps and tabs hereinbefore discussed, the four storage-space-forming flaps 42 and 60 are also integral parts of the folded blank 12.

Considering now the final major component of the container 10, such component comprises a roof or cover 70 which can be fully opened to provide easy access to the interior of the container, which provides means to be described for carrying the container, and virtually all of the parts of which are also integral elements of the folded blank 12.

More particularly, the roof 70 includes two overlappable, front and rear gable-shaped covers 72 and 74 respectively integrally and hingedly connected to the upper edges of the front and rear walls 18 and 20. In closing the covers 72 and 74, the cover 74 is closed first and its ends respectively seat on the gable-shaped rafters 36. Thereafter, the cover 72 is closed and seats on the cover 74.

Referring to FIG. 4, the cover 72 includes two panels 76 and 78 which are bent relative to each other into a triangular or gable configuration. The cover 74 includes panels 80 and 82 also bent into a triangular or gable configuration complementary to the cover 72. When the covers 74 and 72 are closed, with the cover 72 overlying the cover 74, suitable latches 84 releasably secure them together. Preferably, the latches are carried by the cover 74 and cooperate with catches on the cover 72.

The cover 74 includes a ceiling panel 86, FIG. 4, which, as best shown in FIG. 5, is folded back from the panel 82 and secured to the panel 80, as by the structure for securing the latches 84. The ceiling panel or ceiling 86 underlies and is spaced downwardly from the apex of the cover 74, and is provided at its ends with flaps 88 which close the triangular ends of the space between the ceiling and the cover 74. Thus, the ceiling 86 renders the cover 74 strong and rigid.

Considering an important feature of the invention, when the cover 74 is closed, the ceiling 86, reinforced by the flaps 88, is inserted between the gabled rafters 36 in abutting relation therewith. With this relationship, the end walls 26 of the container 10 are securely braced, which is an important feature of the invention.

Considering now how the container 10 is carried, the cover 74 is provided intermediate its ends and at its apex with a hand grip 90, which may be reinforced by a stiffener 92, FIG. 3, under the apex of the cover 74 with a flap 94 of the panel 82 wrapped around and under the stiffener, as will be clear from FIG. 3.

The flap 82 of the cover 74 is provided adjacent the hand grip 90 with an access opening 96, through which the user's fingers may be inserted under the hand grip. A complementary access opening 98 is formed in the panel 78 of the top cover 72. As best shown in FIG. 3, when both covers are closed, the access opening 98 registers with the access opening 96 so that the user's fingers can be inserted under the grip 90.

In addition to the hereinbefore-discussed bracing function performed by the ceiling 86, it also protects the user's fingers, when inserted under the hand grip 90, from possible bites or scratches by a pet within the container 10. This hand guard function of the ceiling 86 is another important feature of the invention.

Figure 9:
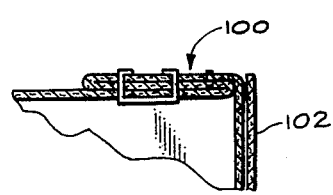
FIG. 9 is an enlarged, fragmentary, horizontal sectional view taken along the arrowed line 9—9 of FIG. 3, showing one of the corners of the litter tray upon assembly.
Figure 8:
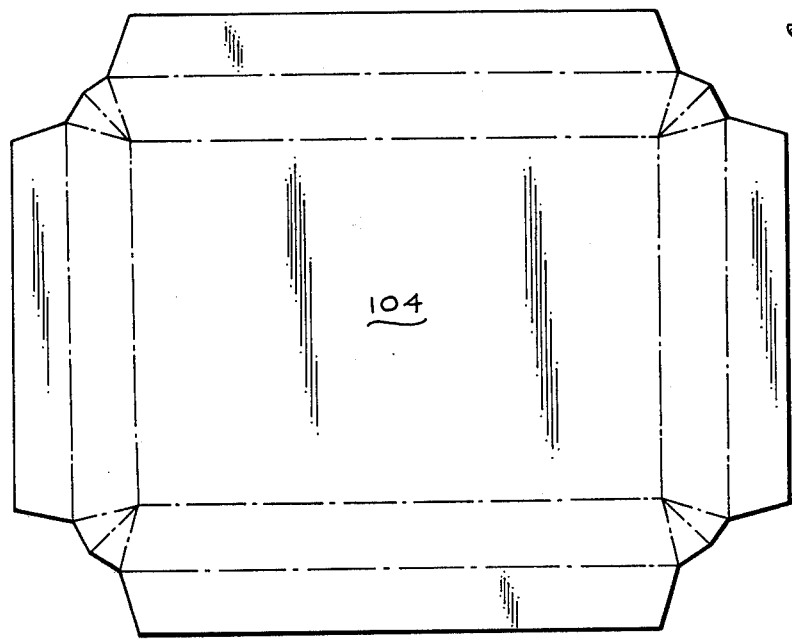
FIG. 8 is a plan view of a blank for forming a litter tray for installation in the container, with the various parts and the folding lines being indicated thereon.

Referring to FIGS. 3, 8 and 9 of the drawings, the container 10 may be equipped with a separate litter tray 100 having a depending peripheral flange 102 fitting over the flaps 58 and 60 of the container to anchor the tray. FIG. 8 shows a blank 104 having panels, flaps, and the like, and fold lines, similar to those associated with the container blank 12. As will be apparent, the blank 104 can be folded into the configuration shown for the litter tray in FIGS. 3 and 9. As also shown in FIG. 9, the folded portions of the litter tray 100 can be secured at the corners of the litter tray in any suitable manner, as by stapling.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In a container comprising a folded blank, the combination of:
   (a) walls comprising folded integral parts of the blank and including front and rear walls and gable-shaped end walls having triangular upper ends;
   (b) gable-shaped rafters integral with and extending along the upper edges of said end walls and extending inwardly of the container from said end walls; and
   (c) each of said end walls being of double thickness and comprising inner and outer end wall panels having along their upper edges interengaged extensions forming the corresponding gable-shaped rafters and interlocked at the peaks of said gable-shaped rafters.

2. A container as defined in claim 1 wherein said extensions of said outer end wall panels are bent around said extensions of said inner end wall panels.

3. In a container comprising a folded blank, the combination of:
   (a) walls comprising folded integral parts of the blank including front and rear walls and gable-shaped end walls having triangular upper ends;
   (b) gable-shaped rafters integral with and extending along the upper edges of said end walls and extending inwardly of the container from said end walls; and
   (c) two overlappable, front and rear gable-shaped covers respectively integrally and hingedly connected to the upper edges of said front and rear walls, one of said covers having ends respectively seatable on said gable-shaped rafters, and the other of said covers being seatable on the first.

4. A container as defined in claim 3 including a ceiling integral with and spaced below said one cover and having ends abuttable with said gable-shaped rafters to act as a brace for said end walls.

5. In a container comprising a folded blank, the combination of:
   (a) walls comprising folded integral parts of the blank and including front and rear walls and gable-shaped ends walls having triangular upper ends;
   (b) two overlappable, front and rear gable-shaped covers respectively integrally and hingedly connected to the upper edges of said front and rear walls;
   (c) one of said covers having ends respectively seatable on the upper ends of said end walls and the other of said covers being seatable on the first; and
   (d) a ceiling integral with said one cover and spaced therebelow.

6. A container according to claim 5 wherein said one cover is provided at its apex with a hand grip and an opening on one side of said apex for access to said hand grip, said other cover having an opening adjacent its apex which registers with said opening in said one cover when said other cover is seated on said one cover.

7. A container as defined in claim 6 wherein said hand grip includes a stiffener under said apex of said one cover and having a flap of said one cover underlying it.

8. In a container comprising a folded blank, the combination of:
   (a) walls comprising folded integral parts of the blank and including front and rear walls and end walls; and
   (b) said end walls having integral vertical flaps extending inwardly of the container toward each other and spaced rearwardly of said front wall to form two inwardly facing, vertical channels for vertical edges of an insert to be located behind said front wall.

9. A container as defined in claim 8 wherein said front wall is provided with a window opening.

10. A container according to claim 9 wherein said walls comprising folded integral parts of said blank form a triple-layer floor having a continuous lower wall and discontinuous intermediate and upper walls.

11. A container as defined in claim 10 wherein said discontinuous upper wall of said floor has upstanding flaps spaced rearwardly of said front wall to provide a horizontal channel to receive a lower edge of an insert having its vertical edges in said vertical channels.

12. In a container comprising a folded blank, the combination of:
 (a) walls comprising folded integral parts of the blank and including front and rear walls and end walls; and
 (b) flaps comprising folded integral parts of the blank located at the four corners of said rear wall and spaced forwardly of said rear wall to permit an insert to be located forwardly of said rear wall and behind said flaps.

13. In a container comprising a folded blank, the combination of:
 (a) walls comprising folded integral parts of the blank and including front and rear walls and end walls and a floor having a continuous lower wall; and
 (b) said end walls being of double thickness and comprising inner and outer end wall panels having along their lower edges inwardly extending, superimposed flaps overlying said lower wall of said floor and forming discontinuous intermediate and upper walls of said floor.

14. A container according to claim 13 wherein said flaps forming said discontinuous upper wall of said floor have edges in abutting relation midway between said end walls.

15. A container according to claim 14 wherein said flaps forming said discontinuous upper wall of said floor have upwardly extending flaps adjacent and spaced rearwardly of said front wall to provide a horizontal channel to receive a lower edge of an insert.

* * * * *